(12) United States Patent
Kobayashi et al.

(10) Patent No.: US 7,725,866 B2
(45) Date of Patent: May 25, 2010

(54) ELECTRONIC PACKAGE EVALUATION APPARATUS, ELECTRONIC PACKAGE OPTIMIZING APPARATUS, AND COMPUTER-READABLE RECORDING MEDIUM IN WHICH ELECTRONIC PACKAGE EVALUATION PROGRAM IS RECORDED

(75) Inventors: Yoko Kobayashi, Kawasaki (JP);
Hidehisa Sakai, Kawasaki (JP);
Yoshiteru Ochi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 11/855,681

(22) Filed: Sep. 14, 2007

(65) Prior Publication Data

US 2008/0127011 A1    May 29, 2008

(51) Int. Cl.
*G06F 17/50* (2006.01)
(52) U.S. Cl. .......................... 716/15; 716/16
(58) Field of Classification Search ............ 716/15–18
See application file for complete search history.

(56) References Cited

U.S. PATENT DOCUMENTS

| | | | | |
|---|---|---|---|---|
| 5,291,419 A | * | 3/1994 | Satoh et al. .................. | 702/34 |
| 6,978,214 B2 | * | 12/2005 | Budell et al. ................. | 702/65 |
| 7,454,723 B2 | * | 11/2008 | Budell et al. ................. | 716/4 |
| 2005/0114050 A1 | * | 5/2005 | Budell et al. ................. | 702/65 |

FOREIGN PATENT DOCUMENTS

| | | |
|---|---|---|
| JP | 2791174 | 6/1998 |
| JP | 11-175764 | 7/1999 |
| JP | 2000-99550 | 4/2000 |
| JP | 2000-304630 | 11/2000 |
| JP | 2003-270060 | 9/2003 |

OTHER PUBLICATIONS

Takashi Kawakami et al., "Stress-Strain Simulation for Structures", *Toshiba Review*, vol. 52, No. 7, Jul. 1, 1997, pp. 38-41.
Takafumi Bessho et al., "Reliability Analyses of Solder Joints with CAE (Computer Aided Engineering)", *Omron Technics*, vol. 37, No. 1, Mar. 25, 1997, pp. 20-24.
Masaya Sakurai et al., "A Study on Thermal Fatigue Life of Bump Material", *Proceedings of the 1997 Electronics Society Conference of IEICE*, Sep. 6, 1997, p. 17.
Hisayuki Kaku et al., "Application of Simulation Technology for Ensuring Reliability of Electronics Parts", *Yasukawa Technical Review*, vol. 63, No. 2, Jun. 21, 1999, pp. 119-124.
Kenji Tsukamoto et al., "Analysis of Interconnection Reliability for Flip Chip Package", *NEC Technical Journal*, vol. 53, No. 6, Jun. 23, 2000, pp. 42-46.

* cited by examiner

*Primary Examiner*—Jack Chiang
*Assistant Examiner*—Binh C Tat
(74) *Attorney, Agent, or Firm*—Staas & Halsey LLP

(57) ABSTRACT

When reliability evaluation of the whole electronic package is performed, the time required for simulation is decreased, while solder connection parts, in particular, are accurately analyzed. The whole analysis model creating unit creates a solder connection part model which has the same volume, height, and connection area as the volume, height, and connection area of the solder connection part. By means of dividing the solder connection model into multiple meshes, the first mesh data for use in electronic package analysis is created.

17 Claims, 15 Drawing Sheets

| LISTING OF PARAMETERS ||||
|---|---|---|---|
| COMPONENT | SIZE OF COMPONENT | NAME OF MATERIAL | MATERIAL MODEL |
| PCB | LENGTH=55<br>WIDTH=55<br>THICKNESS=1.6 | FR4 | ELASTICITY |
| PCB ADJACENT PAD | DIAMETER=0.5<br>THICKNESS=0.029899999 | CU | ELASTICITY,PLASTICITY |
| RESIST | THICKNESS= 0.0098999999 | PSR-400 | AELOTROPIC,ELASTICITY |
| BALL | DIAMETER OF PCB SIDE PAD PART=0.5<br>DIAMETER OF THE CHIP SIDE PAD PART=0.5<br>CENTRAL DIAMETER=0.699<br>HEIGHT=0.42989999 | SOLDER | ELASTICITY, PLASTICITY, CREEP |
| CHIP ADJACENT PAD | DIAMETER=0.5<br>THICKNESS=0.029899999 | CU | ELASTICITY,PLASTICITY |
| INTERHOSER | DIAMETER=23.75<br>WIDTH=23.75<br>THICKNESS=0.23989999 | BT | AELOTROPIC,ELASTICITY |
| UNDERFILL | THICKNESS=0.050000001<br>HEIGHT OF THE EDGE=0.2<br>WIDTH OF THE EDGE=0.2 | UNDERFIL | ELASTICITY |
| CHIP | LENGTH=10.<br>WIDTH=10.<br>THICKNESS=0.75 | SI | ELASTICITY |
| ADHESIVE | LATERAL LENGTH=15.<br>UPRIGHT LENGTH=15.<br>WIDTH=8.75<br>THICKNESS=0.050000001 | ADHISIVE | ELASTICITY |
| RID, TYPE 1 | ADHESIVE THICKNESS=2.<br>THICKNESS=2. | CU | ELASTICITY,PLASTICITY |

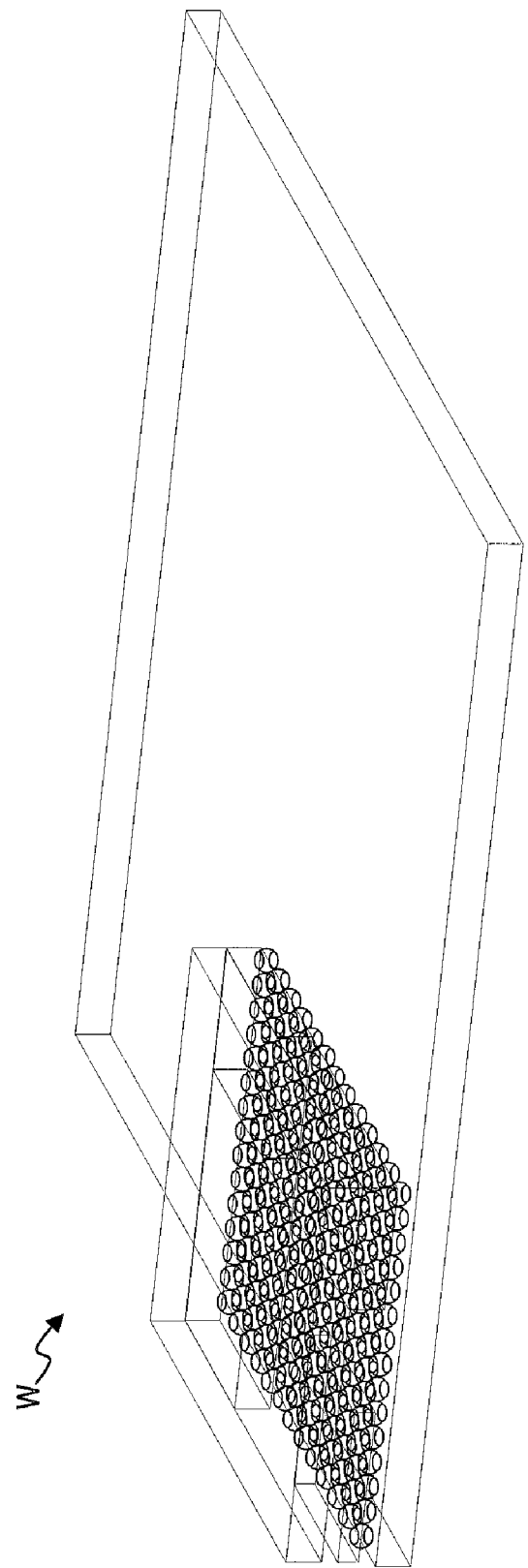

ELECTRONIC PACKAGE EVALUATION APPARATUS, ELECTRONIC PACKAGE OPTIMIZING APPARATUS, AND COMPUTER-READABLE RECORDING MEDIUM IN WHICH ELECTRONIC PACKAGE EVALUATION PROGRAM IS RECORDED

TECHNICAL FIELD

The present invention relates to technology for evaluating electronic package reliability. In particular, the invention relates to technology for creating mesh data for used in construction analysis of the electronic package.

BACKGROUND ART

Recently, electronic equipment such as personal computers and mobile telephones is highly integrated and greater packaging density is realized, and pitch fine design of an electronic package which is mounted for such electronic equipment has been developed at the same time. As the integration and downsizing of the electronic package proceed, concerns about reliability of packaging components, in particular, a solder connection part are increased.

Generally speaking, when a high density packaging is required for an electronic packaging, BGA (Ball Grid Array) or CSP (Chip Scale Package) is widely used. However, a solder connection part of such an electronic package is exposed to stress such as temperature change and fall impact force. Thus, in order to apply such electronic package to actual products, it is necessary to perform sufficient evaluation about strength reliability.

Previously, as a solder connection part strength (micro connection part strength) evaluation, there is an evaluation method with a CAE (Computer Aided Engineering) system based on the simulation technology such as a finite-element method. Today, evaluation with this CAE system is required in design and development of a new package.

However, in the evaluation with the CAE system, when the strength evaluation of the whole electronic package is performed, creation of simulation model and mesh data and simulation calculation need a significant amount of time, because the construction of the electronic package is complicated. Thus, it might take several days to obtain simulation result.

Hence, there is a following technique for evaluating an electronic package (see the following patent document 1). In the technique, to decrease the time necessary for simulation, the analysis model of the electronic package is subjected to rough element division to perform outline analysis of the whole electronic package. On the basis of the result of the outline analysis, a target solder bump is extracted, and the analysis model of the extracted solder bump is subjected to fine (dense) element division to perform detail analysis, thereby the electronic package is evaluated.

[Patent Document 1] Japanese Patent application Laid-open No. 2000-99550

DISCLOSURE OF THE INVENTION

Issue to be Solved by the Invention

Here, in electronic packages (in particular, BGA and CSP in which components are densely mounted), if load is generated due to temperature change or fall impactive force, it often occurs that the largest distortion and force are generated in solder connection parts of the components of the electronic packages. Because of such distortion and force, the solder connection parts are deformed, or solder clacks are generated.

Accordingly, when evaluating an electronic package, it is desirable that solder connection parts are to be evaluated strictly and accurately, and it holds true in the outline analysis in the technique disclosed in the above patent document 1.

However, in the technique disclosed in the above patent document 1, rough element division is performed to the analysis model of the electronic package, to decrease simulation time in the outline analysis. Thus, it is impossible to accurately evaluate a solder connection parts.

In this instance, to perform strict evaluation of the solder connection parts, it is considered that fine element division is performed to the solder connection parts. However, if such fine element division is performed, simulation needs long time, and trade-off relationship between the strict evaluation and the simulation time becomes a bottle neck.

With the foregoing problems in view, an object of the present invention is, when performing evaluation of the reliability of the whole package, to make it possible to perform accurate analysis of solder connection parts, in particular, while decreasing time taken to perform simulation.

Means for Solving the Issue

In order to accomplish the above object, according to the present invention, there is provided an electronic package evaluation apparatus, comprising: a whole analysis model creating unit which creates first mesh data, for executing analysis of an electronic package, by means of dividing each component composing the electronic package into a plurality of meshes based on design data of the electronic package having a solder connection part; a whole analysis executing unit which executes an analysis of the electronic package using the first mesh data created by the whole analysis model creating unit; a target solder connection part extracting unit which extracts a target solder connection part based on an analysis result obtained by the whole analysis executing unit; a detail analysis unit which evaluates reliability of the electronic package by means of executing more accurate analysis than that performed by the whole analysis executing unit for the target solder connection part extracted by the target solder connection part extracting unit, wherein the whole analysis model creating unit creates a solder connection part model having the same volume, height, and connection area as the volume, height, and connection area of the solder connection part, and divides the solder connection part model into a plurality of meshes, thereby creates the first mesh data.

As a preferred feature, the whole analysis executing unit calculates distortion generated in the electronic package as a result of analysis, and the target solder connection part extracting unit extracts a solder connection part in which the largest distortion is generated as the target solder connection part, based on distortion as analysis results obtained by the whole analysis executing unit.

As another preferred feature, an electronic package evaluation apparatus further comprises: a design data creating unit which creates the design data of the electronic package using GUI (Graphical User Interface). At that time, as yet another preferred feature, an electronic package evaluation apparatus further comprising: a package model holding unit which holds an electronic package model of a plurality of types, and the design data creating unit creates the design data of the electronic package based on the electronic package model corresponding to the type of the electronic package selected from the plurality of types of electronic package models in the package model holding unit.

As still another preferred feature, each of the plurality of types of electronic package models includes a representative size parameter, and the design data creating unit creates the design data of the electronic package based on the representative parameter size value input by the GUI. At that time, it is preferred that the plurality types of electronic package models contain an effective range of the representative size parameter, and the design data creating unit includes alert means which generates an alert when the size value of the representative size parameter input by the GUI does not stay within the effective range.

Also, as a further preferred feature, each of the plurality of types of electronic package model holds a specified size value of the representative size parameter, and the design creating unit creates the design data of the electronic package based on the specified size value of the representative parameter.

In this instance, as a preferred feature, an electronic package evaluation apparatus further comprises a material information holding unit which holds material information that is a plurality of types of materials to be used for the electronic package, and the whole analysis executing unit executes the analysis based on the material information selected by the GUI.

As another preferred feature, the detail analysis unit includes: a detail analysis model creating unit which creates second mesh data more accurate than the first mesh data, which is created by the whole analysis model creating unit, for the target solder connection part extracted by the target solder connection part extracting unit; a detail analysis executing unit which analyzes the target solder connection part on the basis of the second mesh data created by the detail analysis model creating unit; and a detail analysis evaluating unit which evaluates reliability of the electronic package on the basis of an analysis result obtained by the detail analysis executing unit. At that time, it is preferred that the detail analysis evaluating unit calculates non-linear distortion from creep distortion and plastic distortion, which are analysis results obtained by the detail analysis executing unit, and performs calculation of the following formula (1) using the maximum value of the calculated non-linear distortion, thereby calculating life cycle as reliability of the electronic package:

$$N_f = \frac{1}{2}\left(\frac{\Delta \varepsilon_{in}}{\varepsilon_0}\right)^{-n} \quad (1)$$

where $N_f$ is life cycle; $\Delta \varepsilon_{in}$ is the maximum value of non-linear distortion; $\varepsilon_0$,n is a constant.

In this instance, as a preferred feature, the detail analysis evaluating unit evaluates the presence or the absence of destruction of the electronic package as reliability of the electronic package on the basis of the life cycle calculated based on the analysis result obtained by the detail analysis executing unit.

In order to accomplish the above object, there is provided an electronic package optimizing apparatus, comprising: a whole analysis model creating unit which creates first mesh data, for executing analysis of an electronic package, by means of dividing each component composing the electronic package into a plurality of meshes based on design data of the electronic package having a solder connection part; a whole analysis executing unit which executes an analysis of the electronic package using the first mesh data created by the whole analysis model creating unit; a target solder connection part extracting unit which extracts a target solder connection part based on an analysis result obtained by the whole analysis executing unit; a detail analysis unit which executes more accurate analysis than that performed by the whole analysis executing unit for the target solder connection part extracted by the target solder connection part extracting unit; and a life cycle optimizing unit which changes the design data of the electronic package so that life cycle, calculated as analysis result obtained by the detail analysis unit, of the electronic package falls within a predetermined range, wherein the whole analysis model creating unit creates a solder connection part model having the same volume, height, and connection area as the volume, height, and connection area of the solder connection part, and divides the solder connection part model into a plurality of meshes, thereby creates the first mesh data.

In this instance, as a preferred feature, the whole analysis executing unit calculates distortion generated in the electronic package as a result of analysis, and the target solder connection part extracting unit extracts a solder connection part in which the largest distortion is generated as the target solder connection part, based on distortion as analysis results obtained by the whole analysis executing unit.

As another preferred feature, the life cycle optimizing unit constructs, by design of experiment, approximate polynomial with items contained in the design data of the electronic package as parameters based on the analysis result obtained by the detail analysis unit, and changes the parameters of the design data based on the approximate pronominal.

In addition, to achieve the above object, there is provided a computer readable recording medium which records an electronic package evaluation program that instructs a computer to execute a function of evaluating an electronic package having a solder connection part, the electronic package evaluation program instructing the computer to function as: a whole analysis model creating unit which creates first mesh data, for executing analysis of an electronic package, by means of dividing each component composing the electronic package into a plurality of meshes based on design data of the electronic package having a solder connection part; a whole analysis executing unit which executes an analysis of the electronic package using the first mesh data created by the whole analysis model creating unit; a target solder connection part extracting unit which extracts a target solder connection part based on a result of analysis by the whole analysis executing unit; a detail analysis unit which executes more accurate analysis than that performed by the whole analysis executing unit for the target solder connection part extracted by the target solder connection part extracting unit, wherein the whole analysis model creating unit creates a solder connection part model having the same volume, height, and connection area as the volume, height, and connection area of the solder connection part, and divides the solder connection part model into a plurality of meshes, thereby creates the first mesh data.

As a preferred feature, the electronic package evaluation program instructs computer to function as that the whole analysis executing unit calculates distortion generated in the electronic package as a result of analysis, and the target solder connection part extracting unit extracts a solder connection part in which the largest distortion is generated as the target solder connection part, based on distortion as analysis results obtained by the whole analysis executing unit.

As another preferred feature, the computer readable recording medium records the electronic package evaluation program instructs the computer to function as a design data creating unit which creates the design data of the electronic package using GUI (Graphical User Interface).

As yet another preferred feature, a computer medium records an electronic package evaluation program, which instructs the computer to function, when the electronic package evaluating program instructs the computer to function as the details analysis unit as: a detail analysis model creating unit which creates second mesh data more accurate than the first mesh data, which is created by the whole analysis model creating unit, for the target solder connection part extracted by the target solder connection part extracting unit; a detail analysis executing unit which analyzes the target solder connection part on the basis of the second mesh data created by the detail analysis model creating unit; and a detail analysis evaluating unit which evaluates reliability of the electronic package on the basis of an analysis result obtained by the detail analysis executing unit.

In this instance, as still another preferred feature, a computer readable recording medium records an electronic package evaluating program, which instructs the computer to function as the detail analysis evaluating unit that calculates non-linear distortion from creep distortion and plastic distortion, which are analysis results obtained by the detail analysis executing unit, and performs calculation of the following formula (1) using the maximum value of calculated non-linear distortion, thereby calculating life cycle as reliability of the electronic package:

$$N_f = \frac{1}{2}\left(\frac{\Delta \varepsilon_{in}}{\varepsilon_0}\right)^{-n} \quad (1)$$

where $N_f$ is life cycle; $\Delta \varepsilon_{in}$ is the maximum value of non-linear distortion; $\varepsilon_0$, n is a constant.

As a further preferred feature, the computer readable recording medium records an electronic package evaluating program, which makes the computer function as the detail analysis evaluating unit which evaluates the presence or the absence of destruction of the electronic package as reliability of the electronic package on the basis of the life cycle calculated based on the analysis result obtained by the detail analysis executing unit.

EFFECTS OF THE INVENTION

In this manner, with this invention, when the whole analysis model creating unit creates the first mesh data for use in the outline analysis of the whole electronic package, as to the solder connection parts of the electronic package, a solder connection part model is created having the volume, height, and connection area as the same as the volume, height, and connection area of the solder connection part. Since this solder connection part model is divided into multiple meshes, while decreasing the time required for the whole analysis by the whole analysis executing unit, it is possible to accurately analyze with respect to the solder connection parts.

Further, the target solder connection part extracting unit extracts a target solder connection part based on the analysis result obtained by the whole analysis executing unit, and the detail analysis unit performs more accurate analysis than an analysis by the hole analysis executing unit to the target solder connection part to perform evaluation of the reliability of the electronic package. Thus, highly accurate analysis is performed to the electronic package, so that accurate evaluation with respect to the electronic package can be performed.

BRIEF DESCRIPTION OF THE DRAWINGS

FIG. 14 is a diagram showing a parameter listing of the design data created by the design data creating unit of the electronic package optimizing apparatus according to one preferred embodiment of the present invention;

FIG. 15 is a diagram showing a preview model created by the whole analysis model creating unit of the electronic package optimizing apparatus according to one preferred embodiment of the present invention.

BEST MODE FOR CARRYING OUT THE INVENTION

Embodiments of the present invention will now be described with reference to the relevant accompanying drawings.

[1] One Preferred Embodiment

Figure 1:
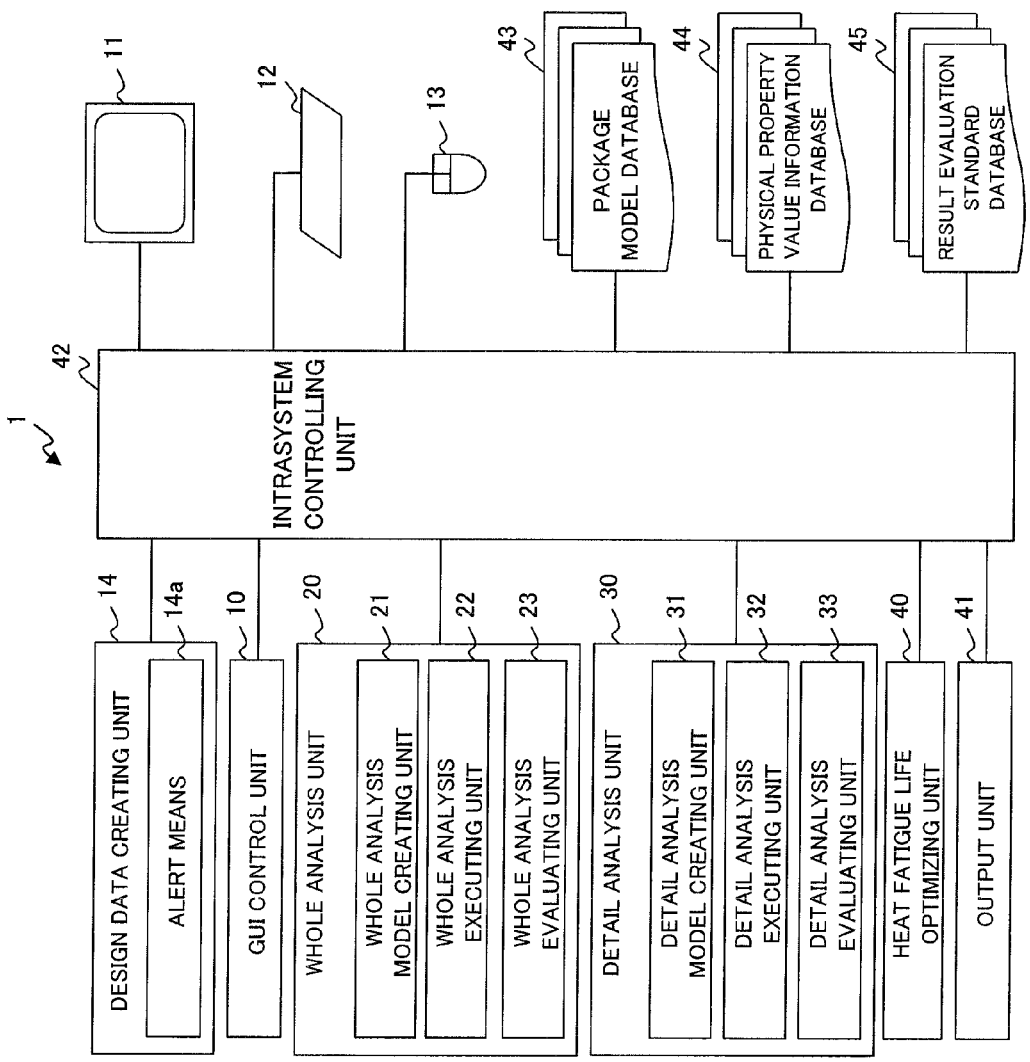
FIG. 1 is a block diagram showing a construction of an electronic package optimizing apparatus according to one preferred embodiment of the present invention.

First of all, a description will be made of an electronic package optimizing apparatus according to one preferred embodiment of the present invention. FIG. 1 is a block diagram which shows a construction of an electronic package optimizing apparatus according to one preferred embodiment of the present invention.

As shown in FIG. 1, the electronic package optimizing apparatus 1 includes: a GUI (Graphical User Interface) control unit 10, a monitor (display unit) 11, a key board 12, a mouse 13, a design data creating unit 14, a whole analysis unit 20, a detail analysis unit 30, a heat fatigue life optimizing unit (life cycle optimizing unit) 40, an output unit 41, an intrasystem controlling unit 42, a package model database (package model holding unit) 43, a physical value information database (material information holding unit) 44, and a result evaluation standard database 45.

In this instance, the GUI control unit 10, the monitor 11, the keyboard 12, the mouse 13, the design data creating unit 14, the whole analysis unit 20, the detail analysis unit 30, the output unit 41, the intrasystem controlling unit 42, the package model data base 43, the physical value information database 44, and the result evaluation standard database 45, function as an electronic package evaluating unit of the present invention.

Further, the output unit 41 outputs outside the result of processing by the design data creating unit 14, the whole analysis unit 20, the detail analysis unit 30, and the heat fatigue life optimizing unit 40.

Furthermore, the intrasystem controlling unit 42 controls inner-system (intrasystem) communication generated in the GUI control unit 10, the monitor 11, the keyboard 12, the mouse 13, the design data creating unit 14, the whole analysis unit 20, the detail analysis unit 30, and the heat fatigue life optimizing unit 40.

The GUI control unit 10 uses the monitor 11, the keyboard 12 and/or the mouse 13 as an interface with a user of the electronic package optimizing unit 1 (hereinafter simply called a user) to execute a part of processing of the design data creating unit 14, the whole analysis unit 20, and the detail analysis unit 30, using GUI.

The design data creating unit 14 creates design data of the electronic package having a solder connection part using GUI. Using the GUI control unit 10 (that is, in cooperation with the GUI control unit 10), the design data creating unit 14 creates design data, while making confirmation with user, in a conversation-like form, various condition for constructing design data of an electronic package (for example, the type, the size, and the material of electronic package model type).

In addition, the design data creating unit 14 has multiple types of electronic package models (see FIG. 2 described below), and creates design data of an electronic package on the basis of the package model database 43, which holds representative size parameter of each model and effective ranges, and the physical property value information database 44, which holds material information of an electronic package (see FIG. 6 described below).

Figure 2:
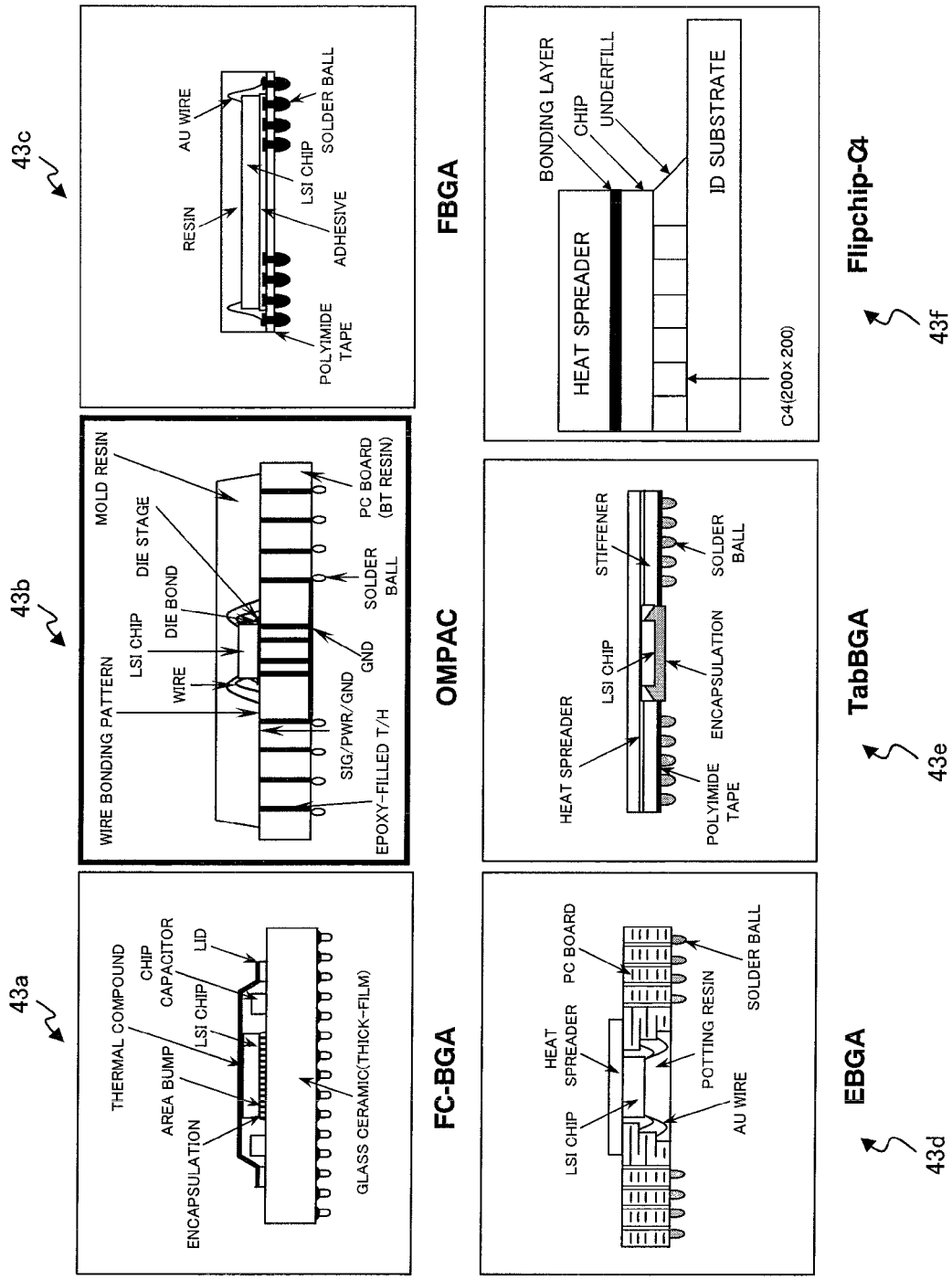
FIG. 2 is a diagram for describing a package model held in a package model database of the electronic package optimizing apparatus according to one preferred embodiment of the present invention.

Here, a detail description of the method of creating electronic package design data by the design data creating unit 14 is given. FIG. 2 is a diagram showing multiple types of package models held in the package model database 43. As shown in this FIG. 2, the package model database 43 has multiple types (here, 6 types) of electronic package models corresponding to the types of electronic packages.

Specifically, the package model database 43 holds electronic package models of FC-BGA (Flip Chip-Ball Grid Array) 43a, OMPAC (Over Molded Pad Array Carrier) 43b, FBGA (Fine-pitch Ball Grid Array) 43c, EBGA (Enhanced Ball Grid Array) 43d, TabBGA (Tab Ball Grid Array) 43e, and Flipchip-C4 (Controlled Collapse Chip Connection) 43f.

Then, the GUI control unit 10 displays these six types of electronic packages on the monitor 11, as shown in FIG. 2, and design data creating unit 14 shows a message, etc., to a user, thereby encouraging the user to select the type of the electronic package to be subjected to optimization (evaluation).

Here, the user operates the mouse 13 (for example, the user operates the mouse 13, and moves a pointer onto a desired model and clicks the mouse 13 on the model), thereby selecting the type of the electronic package to be subjected to optimization from multiple types of electronic package model. Then the design data creating unit 14 creates design data based on the selected electronic package model. In FIG. 2, an example is shown in which OMPAC 43b is selected.

Figure 3:
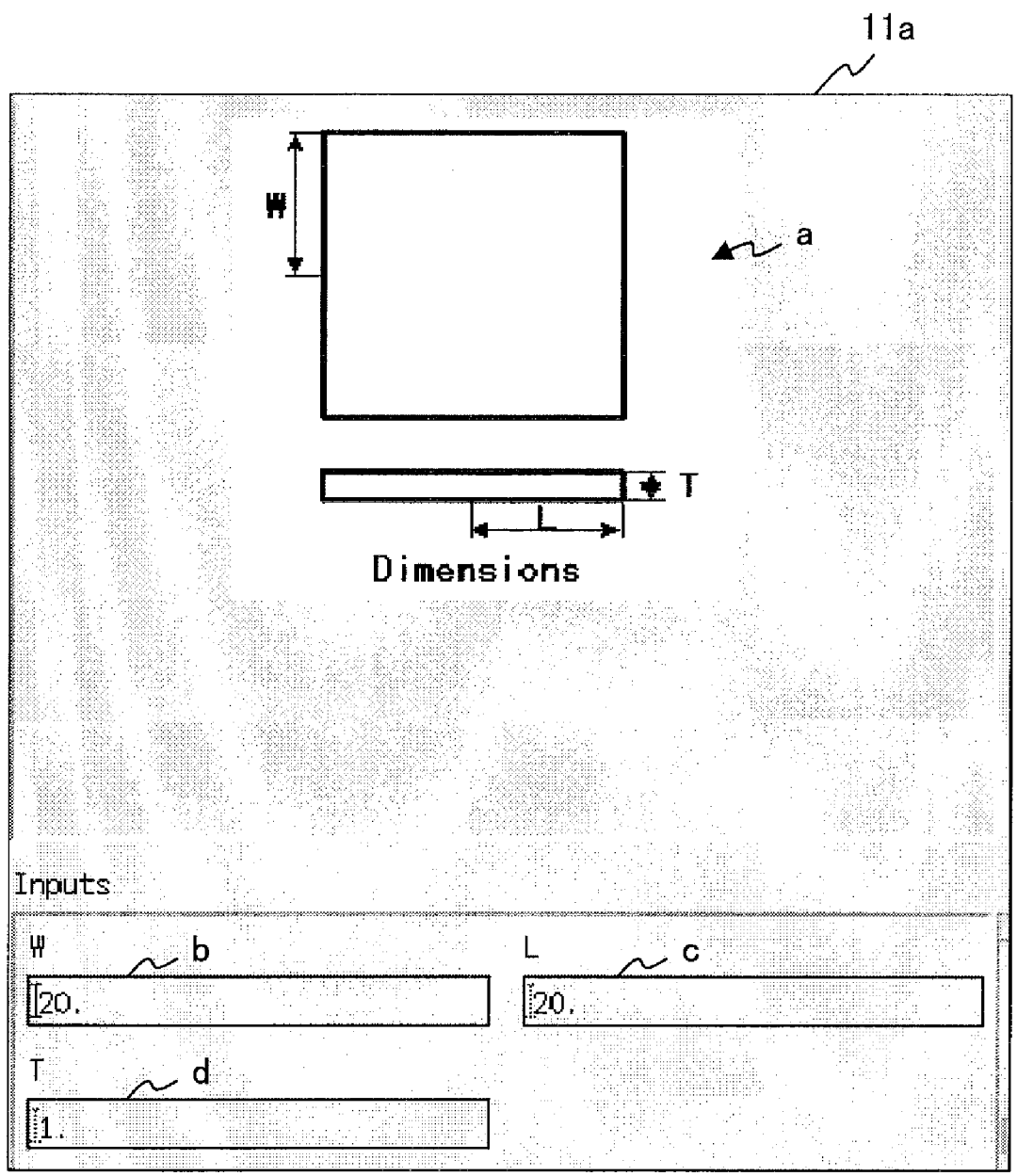
FIG. 3 is a diagram showing a size input image view displayed on a display unit of the electronic package optimizing apparatus according to one preferred embodiment of the present invention.

After that, the GUI control unit 10 makes the monitor 11 display thereon, as shown in FIG. 3, a size input screen image 11a composed of a parameter display part a, which shows the representative parameters (W, L, T) of the electronic package selected by the user, and the size input image 11a composed of size input boxes b, c, and d for inputting the size values corresponding to the representative size parameters (W, L, T), based on the representative size parameters of electronic package model held in the package model database 43.

Here, the representative size parameters held in the package model database 43 means a part of the electronic package to which the size is to be input when design data of electronic package is created.

Then, the user follows the instruction of the size input screen image 11a of FIG. 3, and refers to the parameter display part a, and operates the key board 12 and the mouse 13 to input the size values (in FIG. 3, "20", "20", and "1", respectively) in the size input boxes b through d. Then, the design data creating unit 14 creates design data based on the size value of the input representative size parameters.

In addition, the package model database 43 holds an effective range for each representative size parameters. The design data creating unit 14 has an alert means 14a which generates an alert when the size values of the representative size parameters input by a user are not within the effective range. With this arrangement, it can be prevented that the size value input by the user makes the electronic package have an impossible shape.

Further, the package model database 43 holds a predetermined size value for each representative size parameter. If the size value of the representative parameter is not input by the user, the design data creating unit 14 creates design data based on the predetermined value of the representative size parameter held in the package model database 43.

Next, the design data creating unit 14 creates design data of the electronic package based on material information held in the physical property value information database 44.

Here, material information held in the physical property value information database 44 is information about multiple types of materials which can be used for an electronic package. More specifically, multiple types of materials, physical property values [for example, elasticity (Young's modulus), Poisson ratio, and thermal expansion coefficient] for each material.

Figure 4:
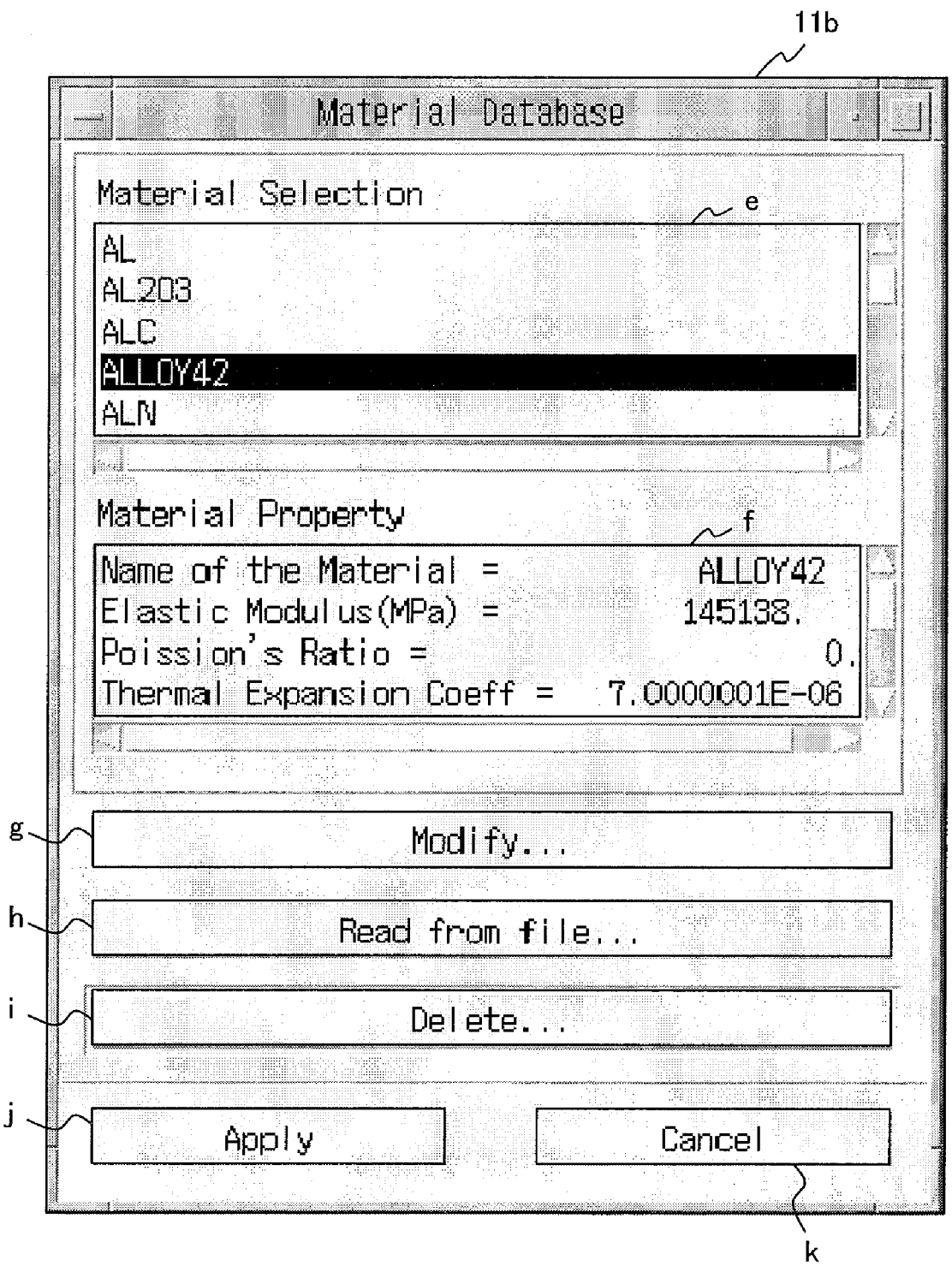
FIG. 4 is a diagram showing a material selecting image view displayed on a display unit of the electronic package optimizing apparatus according to one preferred embodiment of the present invention.

Then, the GUI control unit 10, as shown in FIG. 4, shows a material selecting image 11b composed of a material selecting part e, in which the names of the multiple types of material held in the physical property value information database 44 is shown, a physical property value display part f, in which physical property values of the materials is shown, a Modify (change) button g, a Read-from-file (read data from a file) button h, a Delete button i, an Apply (register) button j, and a Cancel button k, on the monitor 11.

Next, when the user follows the material selecting screen image 11b of FIG. 4 to operate the mouse 13 and to select material of the constitution part of electronic package from material list displayed in the material selection part e, the design data creating unit 14 creates the design data based on the selected material. Here, for example, the user operates the mouse 13 to put the pointer on the desired material of the material selecting unit e, and clicks the mouse 13. Further, the mouse 13 is used to click the "Apply" button j to select material. In this instance, the material selection screen image 11b shown in FIG. 4 shows that "ALLOY 42" is selected as a material.

Here, the physical property value display part f of the material selection screen image 11b displays the physical property of the material selected by the material selecting part e [here, Elastic Modulus (MPa); elasticity rate; Poisson's Ratio; and Thermal Expansion Coefficient].

Further, the user clicks the Modify button g by the mouse 13, thereby making it possible to change the physical property values displayed in the physical property value display part f to the desired value.

Furthermore, when the user clicks the Read-from-file button h with the mouse 13, it is possible to take in material information about materials which are not held in the physical property value information database 44 from an external ASKII file different from physical property value information database 44, to add to the physical property value information database 44 (that is, it is possible to display materials for material selection part e of the material selection screen image 11b). Here, such an ASKII file needs to be created by the user beforehand.

In addition, when the user clicks the Delete button i with the mouse 13, it is possible to delete material information about the material selected in the material selecting part e from the physical property value information database 44 (that is, it is possible to delete such material from the material selecting part e of the material selection screen image 11b).

In this manner, the design data creating unit 14 cooperates with the GUI control unit 10 and creates design data using GUI, based on information held in the package model database 43 and the physical property value information database 44.

Figure 5:
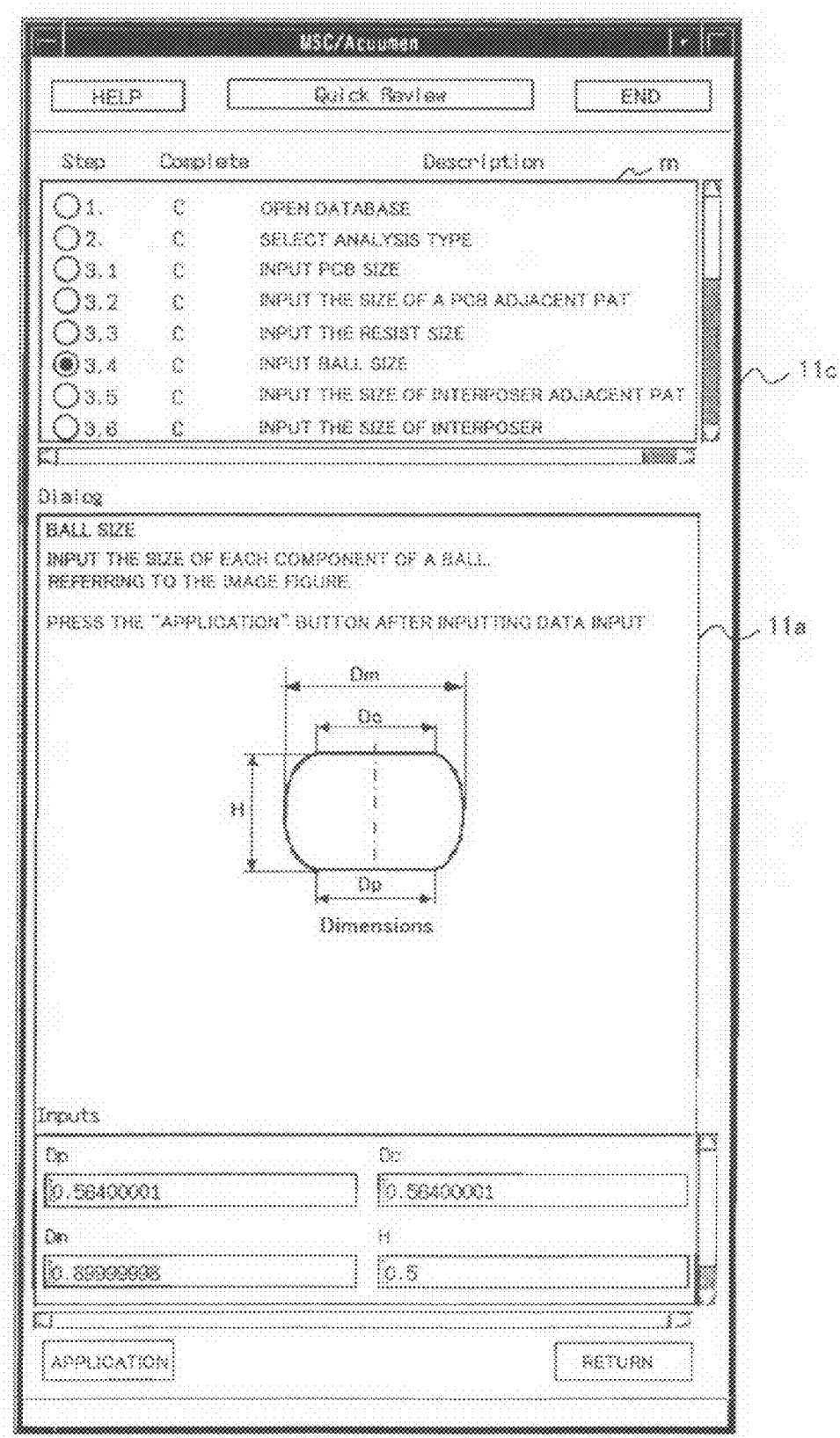
FIG. 5 is a diagram showing an operation image view displayed on a display unit of the electronic package optimizing apparatus according to one preferred embodiment of the present invention.

In addition, the design data creating unit 14, like the operation screen image 11c as shown in FIG. 5, prefers to show, together with the size input image 11a similar to which is shown in FIG. 3, a guidance screen image m etc. showing a part to which operation procedures of the users and size are to be set on the monitor 11.

The whole analysis unit 20 performs an abbreviated analysis of the whole electronic package based on the design data of the electronic package created by the design creating unit 14, and includes a whole analysis model creating unit 21, a whole analysis executing unit 22, and the whole analysis evaluating unit (a target solder connection part extracting unit) 23.

The whole analysis model creating unit 21 divides each component composing the electronic package into multiple meshes based on the design data of the electronic package created by design data creating unit 14 to create the first mesh data for using in analysis of the electronic package. In this instance, the whole analysis model creating unit 21 performs mesh dividing more coarsely than the second mesh data created by the detail analysis model creating unit 31 of detail analysis unit 30 described later. This is for decreasing analysis time by the whole analysis executing unit 22.

Figure 6:
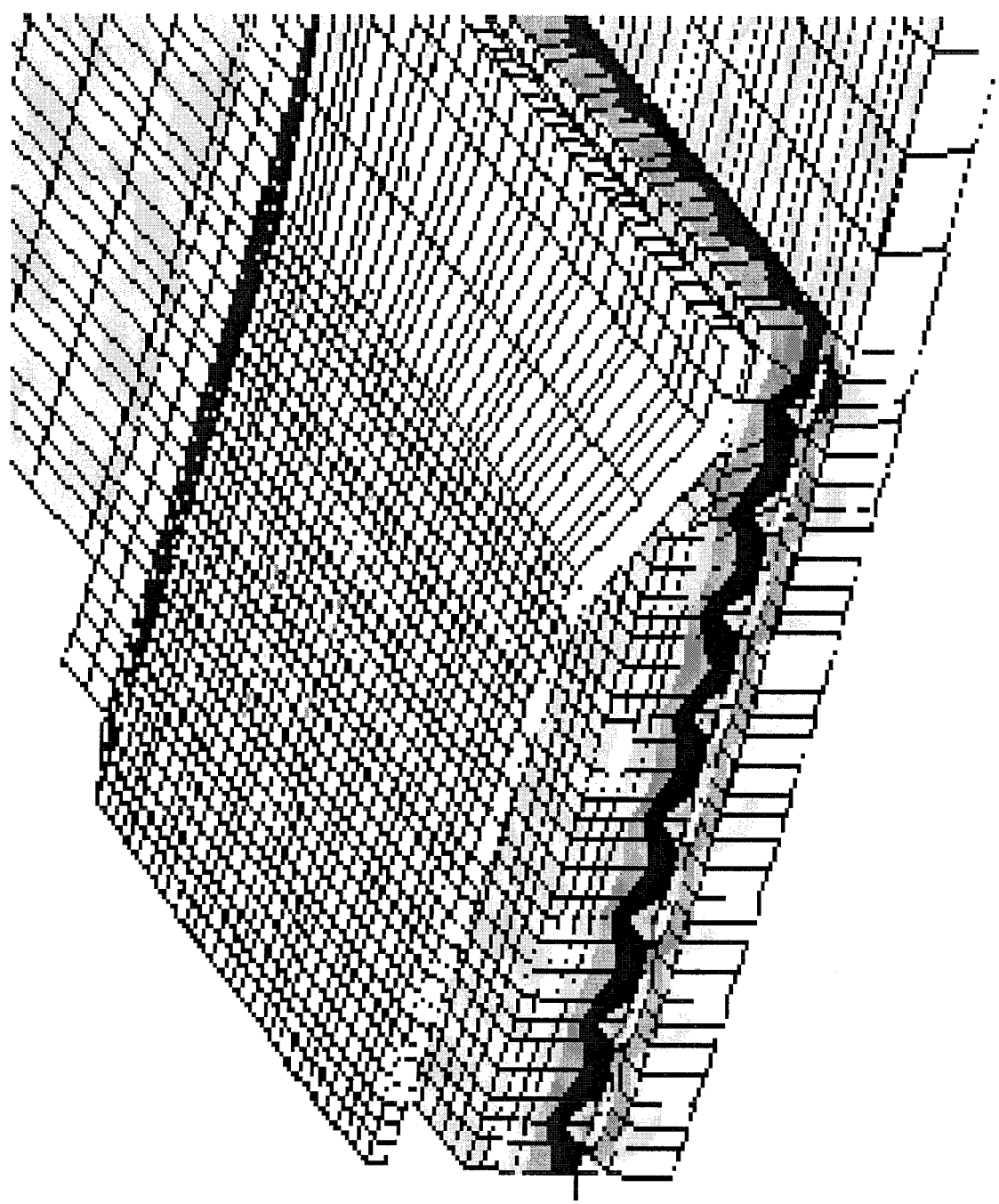
FIG. 6 is a diagram showing first mesh data created by a whole analysis model creating unit of the electronic package optimizing apparatus according to one preferred embodiment of the present invention.

Concretely, the whole analysis model creating unit 21 creates ¼ model corresponding to the ¼ of the electronic package which is divided into equal two parts in the width direction and the depth direction, and divides this ¼ model into mesh for each component, thereby creating first mesh data as shown in FIG. 6. Here, the first mesh data shown in FIG. 6 is created based on FC-BGA design data created by the design data creating unit 14.

Here, the reason why the whole analysis model creating unit 21 creates the first mesh data corresponding to the ¼ part of the electronic package created by the design data creating unit 14, is for reducing analysis time of the electronic package of the whole analysis executing unit 22. If the first mesh data corresponding to ¼ part of the electronic package is used in the whole analysis executing unit 22, no problem is brought about the accuracy of the analysis.

Further, the whole analysis model creating unit 21 creates the first mesh data using GUI. The whole analysis model creating unit 21 cooperates with the GUI control unit 10 to create the first mesh data while confirming interactively with a user about the condition such as the number of mesh elements and the mesh size, etc. when dividing ¼ model into mesh for each component. Hereby, the user is capable of creating the first mesh data so that desired analysis time and analysis accuracy are realized in the abbreviated analysis by the whole analysis executing unit 22.

Further, the whole analysis model creating unit 21 creates a solder connection part model having the same volume, height, and the connection area with another component, as the solder connection part of the electronic package and divides the solder connection part model into multiple meshes, thereby creating the first mesh data.

Figure 7C:
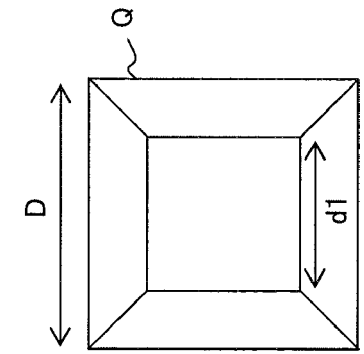
FIG. 7 is a diagram for describing solder connection part model created by the whole analysis model creating unit of the electronic package optimizing apparatus according to one preferred embodiment of the present invention; (a) is a diagram showing a solder connection part; (b) is a side view of a solder connection part model created by the whole analysis model creating unit; and (c) is a top view of a solder connection part.
Figure 7B:
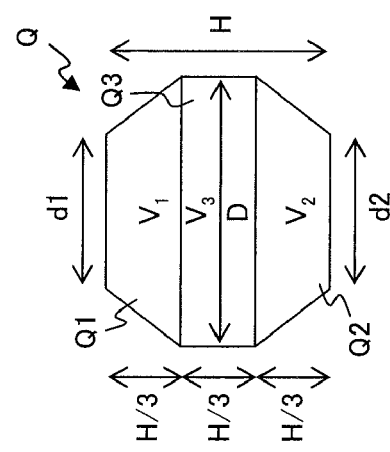
Figure 7A:
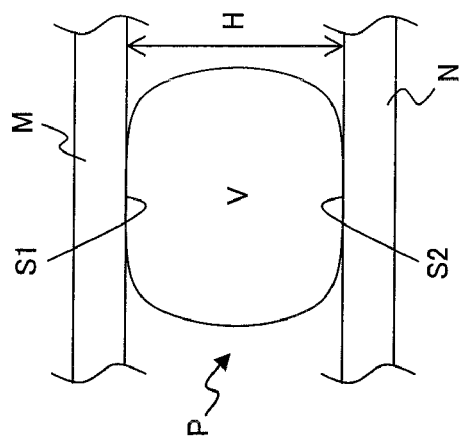

FIG. 7(a) through FIG. 7(c) are diagrams for describing a solder connection part model Q created by the whole analysis model creating unit 21. As to a solder connection part P connecting a component M and a component N, as shown in FIG. 7(a), the whole analysis model creating unit 21 creates a solder connection part model Q in which solder connection part P, volume, height, and connection area between the component M and N are the same as each other, as shown in FIG. 7(b). This solder connection part model Q is composed of hexahedrons Q1 and Q2, and a rectangular parallelepiped Q3. The height of the polyhedrons Q1 through Q3 is the same, and the whole analysis model creating unit 21 creates the solder connection part model Q so that the height of the polyhedrons Q1 through Q3 becomes H/3.

In this instance, as shown in FIG. 7(b) and FIG. 7(c), the whole analysis model creating unit 21 creates solder connection part model Q so that the face corresponding to the connection face of the solder connection part P and the component M is a square with a side $d_1$, and creates the connection part model Q so that the face corresponding to a connection face of the solder connection part P and the component N is a square with a side $d_2$. In this instance, in FIG. 7(b) and FIG. 7(c), reference character D indicates a base of the hexahedron Q1, a top side of the hexahedron Q2, and the width of the rectangular parallelepiped Q3.

Figure 8B:
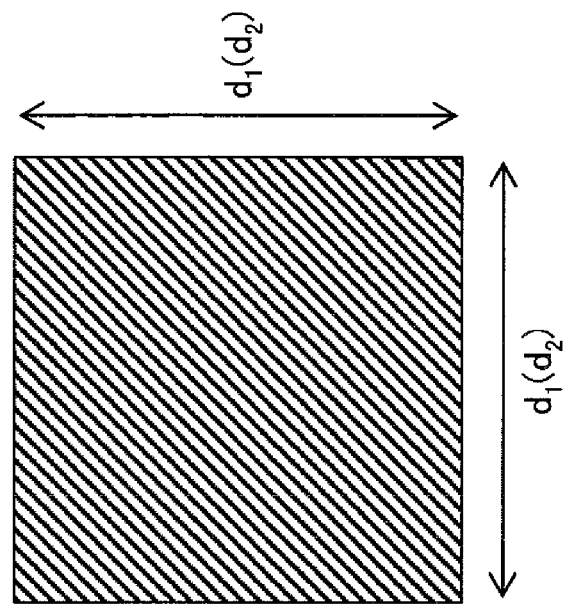
FIG. 8 is a diagram for describing a method of creating a solder connection part model by the whole analysis model creating unit of the electronic package optimizing apparatus according to one preferred embodiment of the present invention; (a) is a diagram showing a connection face of the solder connection part; (b) is a diagram showing a connection face of a solder connection model corresponding to the connection face of the solder connection part shown in (a)
Figure 8A:
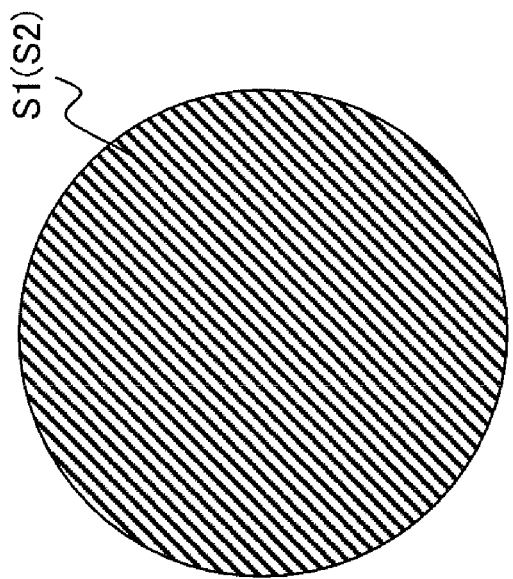

Further, in FIG. 7(a), reference character H indicates the height of the solder connection part P, and reference character V indicates the volume of the solder connection part P. In FIG. 7(a) and FIG. 8(a) which will be described later, reference character S1 indicates the connection area between the solder connection part P and a component M, and reference character S2 indicates connection area of the solder connection part P with the component N.

Here, as shown in FIG. 7(a), the height H of the solder connection part P is a distance between two connection faces with which the solder connection part is connected with other components (here, component M and N).

In this instance, the volume V, the height H, and the connection areas S1 and S2 are contained in design data created by the design data creating unit 14, and these values, as described above with reference to FIG. 3, can be set by confirming by the design data creating unit 14 to a user using GUI, or can be set by the design data creating unit 14 based on the type and size of the electronic package of the design data created by the design data creating unit 14 and the reference value based on the actually measured value prepared beforehand.

Further, in FIG. 7(b), the reference characters $V_1$, $V_2$, and $V_3$ indicate the volume of hexahedrons Q1 and Q2, and a rectangular parallelepiped Q3, respectively.

Next, referring to FIG. 8(a), FIG. 8(b), FIG. 9(a), and FIG. 9(b), a description will be made of a method of creating a solder connection part model Q by the whole analysis model creating unit 21. The whole analysis model creating unit 21 calculates the length $d_1$ of the connection part of the solder connection part model Q corresponding to the connection face between the solder connection part P, shown in FIG. 8(b), with the component M, based on the connection area S1 of the connection face between the solder connection part P and the component M, shown in FIG. 8(a), using the following formula (2).

$$d_1 = \sqrt{S1} \qquad (2)$$

Likewise, the whole analysis model creating unit 21 calculates the length $d_2$ of the connection part of the solder connection part model Q corresponding to the connection face between the solder connection part P, with the component N, based on the connection area S2 of the connection face between the solder connection part P and the component N, using the following formula (3).

$$d_2 = \sqrt{S2} \qquad (3)$$

In this manner, the whole analysis model creating unit 21 creates the solder connection part model Q having the connection area the same as the connection areas S1 and S2 of the solder connection part P.

Next, a description will be made of the method of making the volume of the solder connection part model Q the same as the volume V of the solder connection part P by the whole analysis model creating unit 21 (that is, calculation method of the side D of FIG. 7(b) and FIG. 7(c)).

Figure 9A:
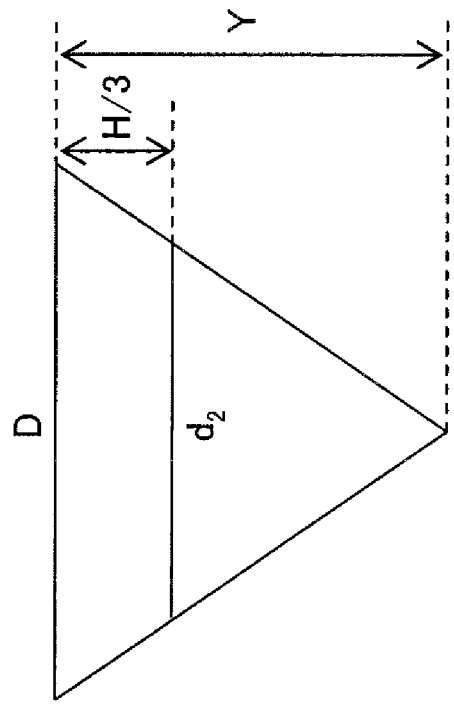
FIG. 9 is a diagram for describing a method of creating a solder connection part model created by the whole analysis model creating unit of the electronic package optimizing apparatus according to one preferred embodiment of the present invention; (a) and (b) are views each showing a hexahedron part of the solder connection model.
Figure 9B:
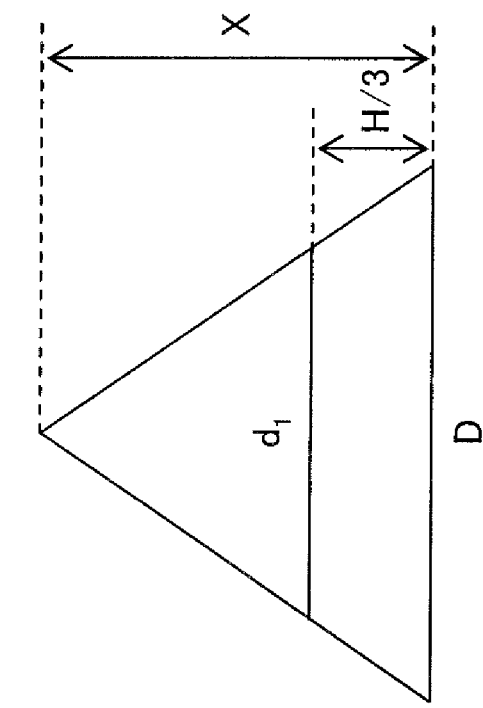

Here, FIG. 9(a) and FIG. 9(b) show the sections of the hexahedrons Q1 and Q2. As shown in FIG. 9(a), the volume $V_1$ of the hexahedron Q1 can be calculated by the following formula (4); as shown in FIG. 9(b), the volume $V_2$ of the hexahedron Q2 can be calculated by the following formula (5);

$$V_1 = \frac{D^2 X}{3} - \frac{d_1^2\left(X - \frac{H}{3}\right)}{3} \qquad (4)$$

$$V_2 = \frac{D^2 Y}{3} - \frac{d_2^2\left(Y - \frac{H}{3}\right)}{3} \qquad (5)$$

In addition, on the basis of FIG. 9(a), the following formula (6) holds true, and the following formula (7) holds true based on FIG. 9(b).

$$X d_1 = DX - \frac{H}{3} D \qquad (6)$$

$$Y d_2 = DY - \frac{H}{3} D \qquad (7)$$

Accordingly, the whole analysis model creating unit 21 substitutes the above formulas (6) and (7) for the following formulas (8) and (9), and substitutes the following equation (8) and (9) into the above formulas (4) and (5), thereby obtaining the following formulas (10) and (11).

$$X = \frac{\frac{H}{3} D}{D - d_1} = \frac{HD}{3(D - d_1)} \qquad (8)$$

$$Y = \frac{\frac{H}{3} D}{D - d_2} = \frac{HD}{3(D - d_2)} \qquad (9)$$

$$V_1 = \frac{HD^3}{9(D - d_1)} - \frac{H d_1^2 D}{9(D - d_1)} + \frac{H d_1^2}{9} \qquad (10)$$

$$V_2 = \frac{HD^3}{9(D - d_1)} - \frac{H d_2^2 D}{9(D - d_2)} + \frac{H d_2^2}{9} \qquad (11)$$

Here, since the volume of the solder connection part model Q is expressed by the following formula (12), the whole analysis model creating unit 21 substitutes the above formulas (10) and (11) into the following formula (12), thereby obtaining the following formula (13). By means of solving the following formula (13) for D, the side D corresponding to the base of the hexahedron Q1, the top side of the hexahedron Q2, and the width of the rectangular parallelepiped Q3, are calculated.

$$V = V_3 + V_1 + V_2 = \frac{H}{3} D^2 + V_1 + V_2 \qquad (12)$$

$$V = \frac{H}{3} D^2 + \frac{HD^3}{9(D - d_1)} - \frac{H d_1^2 D}{9(D - d_1)} + \frac{H d_1^2}{9} + \frac{HD^3}{9(D - d_2)} - \frac{H d_2^2 D}{9(D - d_2)} + \frac{H d_2^2}{9} \qquad (13)$$

In this manner, the whole analysis model creating unit 21 creates a solder connection part model Q having a volume the same as the volume of the solder connection part P by means of calculating the side D corresponding to the base of the hexahedron Q1, the top side of the hexahedron Q2, and the width of the rectangular parallelepiped Q3.

The whole analysis executing unit 22 executes analysis of the whole electronic package using the first mesh data created by the whole analysis model creating unit 21. Here, distortion generated in the electronic package is calculated by executing analysis by the finite-element method.

At that time, the whole analysis executing unit 22 executes analysis using material information (here, physical property values of the types of material) of each component selected by a user with GUI at the time the design data creating unit 14 creates design data, which was described above referring to FIG. 4.

Further, the whole analysis executing unit 22 cooperates with the GUI control unit to interactively confirm to a user, thereby obtaining load and temperature change (temperature change, for example, 25° C.→125° C.→25° C.→40° C. is one cycle) necessary for performing analysis. In this instance, such various conditions can be contained design data created by the design data creating unit 14. In this case, at the stage of creating the design data, the design data creating unit 14 sets such various conditions with GUI, and the whole analysis executing unit 22 executes analysis based on the various conditions contained in the design data.

The whole analysis evaluating unit 23 evaluates the analysis result performed to the whole electronic package executed by the whole analysis executing unit 22. Concretely, the whole analysis evaluating unit 23 extracts a solder connection part in which the maximum distortion is generated as a target solder connection part based on distortions obtained as analysis result by the whole analysis executing unit 22.

The detail analysis unit 30 performs more accurate analysis than the whole analysis executing unit on the target solder connection part extracted by the whole analysis evaluating unit 23 in order to evaluate the reliability of the electronic package, and includes a detail analysis model creating unit 31, a detail analysis executing unit 32, and a detail analysis evaluating unit 33.

Figure 10:
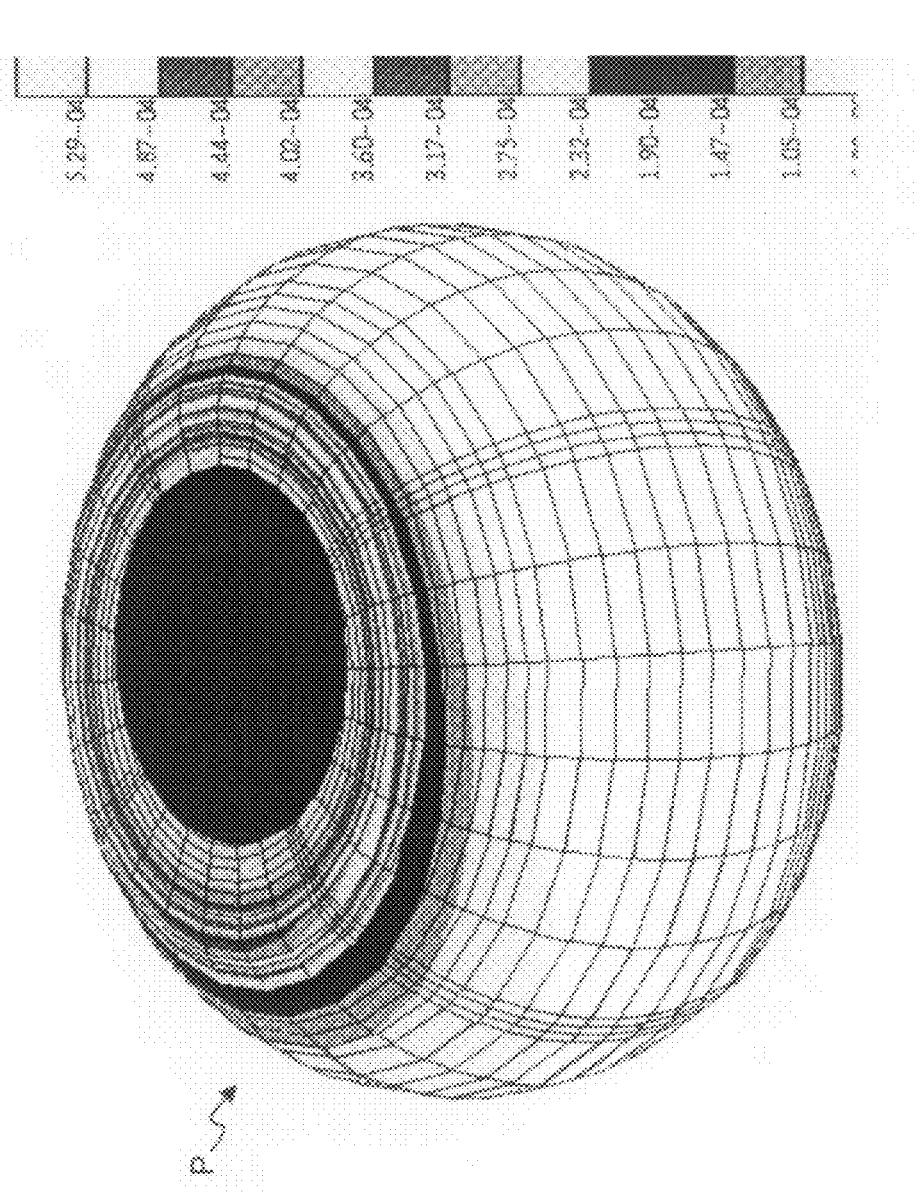
FIG. 10 is a diagram showing second mesh data created by the detail analysis model creating unit of the electronic package optimizing apparatus according to one preferred embodiment of the present invention.

The detail analysis model creating unit 31 creates more accurate (that is, finer mesh division is performed than the first mesh data created by the whole analysis model creating unit 21) second mesh data than the first mesh data created by the whole analysis model creating unit 21, as shown in FIG. 10, for the target solder connection part P in which the maximum distortion extracted by the whole analysis evaluating unit 23 is generated. In this instance, in FIG. 10, together with the second mesh data, the analysis result by the detail analysis executing unit 32 (distortion distribution) is shown by classification by coloring, but actually, the second mesh data created by the detail analysis model creating unit 31 is not subjected to classification by coloring as shown in FIG. 10.

Figure 11:
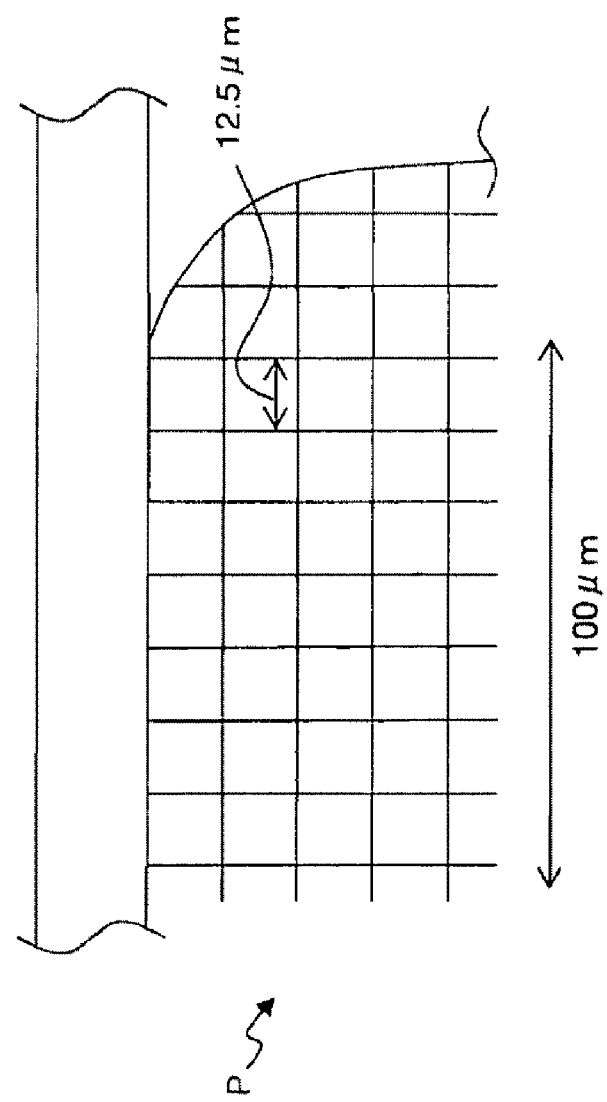
FIG. 11 is a diagram for describing the size of mesh data used in the detail analysis evaluating unit used by a detail analysis executing unit of the electronic package optimizing apparatus and the detail analysis evaluating unit according to one preferred embodiment of the present invention.

Further, the detail analysis model creating unit 31 creates the second mesh data of standard mesh size which is standardized beforehand. Since the detail analysis executing unit 32 performs analysis by the finite element method, the analysis result obtained by the detail analysis executing unit 32 is significantly effected by the region size (that is, mesh size) of the second mesh data. Accordingly, the mesh size, which is important in reliability evaluation by the detail analysis evaluating unit 33, is standardized. In this instance, standardizing of the standard mesh size is performed, for example, based on past actual measurement values and reliability evaluation result, and as shown in FIG. 11, in the case of solder connection part, one side of the mesh is 12.5 μm.

The detail analysis executing unit 32 executes analysis of the target solder connection part based on the second mesh data created by the detail analysis model creating unit 31. As described above, the detail analysis executing unit 32 performs analysis by the finite element method to calculate distortion generated in the target solder connection part. At that time, the detail analysis executing unit 32, like the whole analysis executing unit 22, obtains the load and temperature change necessary for analysis, and execute analysis based on such conditions.

The detail analysis evaluating unit 33 calculates non-linear distortion from creep distortion and plasticity distortion obtained as results of analysis by the detail analysis executing unit 32. Using the maximum value of the calculated non-linear distortion $\Delta \epsilon_{in}$, the detail analysis evaluating unit 33 calculates fatigue life cycle as the reliability of the electronic package with the Coffin-Manson law shown in the following formula (1), $$N_f = \frac{1}{2}\left(\frac{\Delta \varepsilon_{in}}{\varepsilon_0}\right)^{-n} \tag{1}$$

where $N_f$ is fatigue life cycle; $\Delta \epsilon_{in}$ is the maximum value of non-linear distortion; $\epsilon_0$, n is a constant.

In this instance, $\Delta \epsilon_{in}$ is obtained from distortion distribution shown in FIG. 10 obtained as analysis result by the detail analysis executing unit 32.

Here, the detail analysis evaluating unit 33 determines beforehand the standard of the method of evaluation of the analysis result. For example, as to a part, such as solder connection interfaces, in which the analysis result extremely changes as forces are concentrated, forces of the analysis result of a 100 μm area from the interfaces are averaged as shown in FIG. 11.

Further, the detail analysis evaluating unit 33 determines the presence or the absence of destruction of an electronic package, on the basis of past analysis results and the evaluation reference value based on the implementation result, which are held in the result evaluation reference database 45, and on the basis of the life cycle calculated by the above formula (1).

That is, the detail analysis evaluating unit 33 evaluates whether or not the calculated life cycle is a desired life cycle, based on data held in the result evaluation reference database 45, thereby performing destruction evaluation of an electronic package.

The heat fatigue life optimizing unit 40 changes design data of an electronic package so that the life cycle of the electronic package calculated as an analysis result obtained by the detail analysis unit 30 falls within a predetermined range.

Specifically, the heat fatigue life optimizing unit 40 first constructs, an approximate polynomial having items contained in design data of the electronic package as parameters, based on the analysis result of the detail analysis unit 30, by design of experiments method.

The heat fatigue life optimizing unit 40, for example, constructs an approximate polynomial as shown in the following formula (14).

distortion=120−0.623*X1+1.65*X1²−4.15E−07*X2+ 5.75E−11*X2²−1.09E−05*X3+5.19E−09*X3²− 3.47E−04*X4+3.72E−06*X4² (14)

In this instance, in the above approximate polynomial (14), X1 indicates the substrate thickness of the electronic package; X2 indicates Young's modulus of the substrate; X3 indicates Young's modulus of an adhesive; X4 indicates a thermal expansion coefficient.

The heat fatigue life optimizing unit 40 changes parameters X1 through X4 based on the above constructed approximate polynomial (14) so that the life cycle of the electronic package is long.

Figure 12:
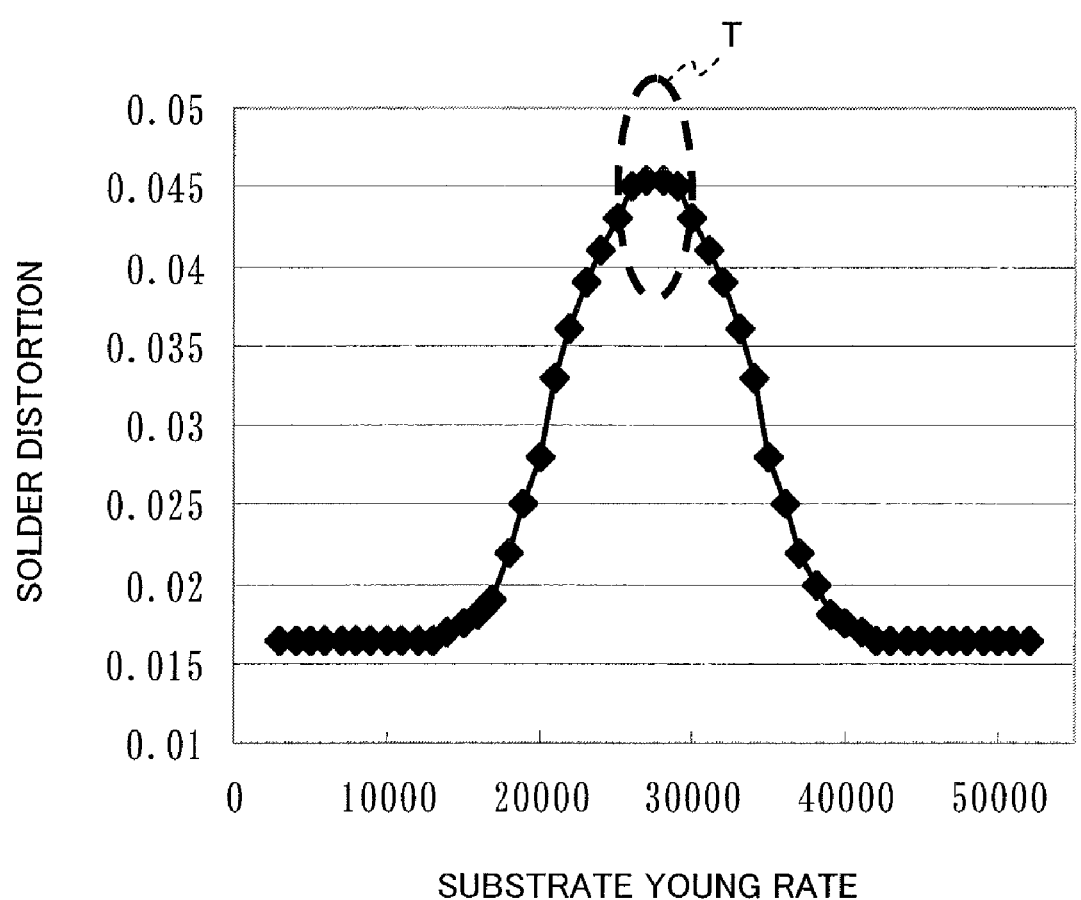
FIG. 12 is a diagram showing a relationship between substrate young rate and distortion as parameters, based on approximation polynomial constructed by heat exhaustion optimizing unit of the electronic package optimizing unit according to one preferred embodiment of the present invention.

For example, as shown in FIG. 12, based on the above approximate polynomial (14), the relationship between the parameter X2 (substrate Young's modulus) and distortion (in the drawing, described as solder distortion) can be expressed by a Gaussian distribution shape.

Here, in order to avoid area T in which distortion becomes large and the electronic package has a short lifetime, the heat fatigue life optimizing unit 40 changes the value of parameter X2.

Then, the parameters X1, X3, and x4 are changed similarly to the parameter X2, and the heat fatigue life optimizing unit 40 changes the parameters X2 through X4 so that the life cycle of the electronic package does not become short but become long (that is, changes design data of the electronic package).

In this manner, the heat fatigue life optimizing unit 40 constructs the following approximate polynomial (14) to clarify the effect of the relationship between a force generated in the target solder connection part P, which is a subject of analysis by the detail analysis unit 30, and distortion on the life cycle of the electronic package. Further, parameters of such approximate polynomial (14) are changed in such a manner that the electronic package has a long life time, avoiding to have a short life time.

Figure 13:
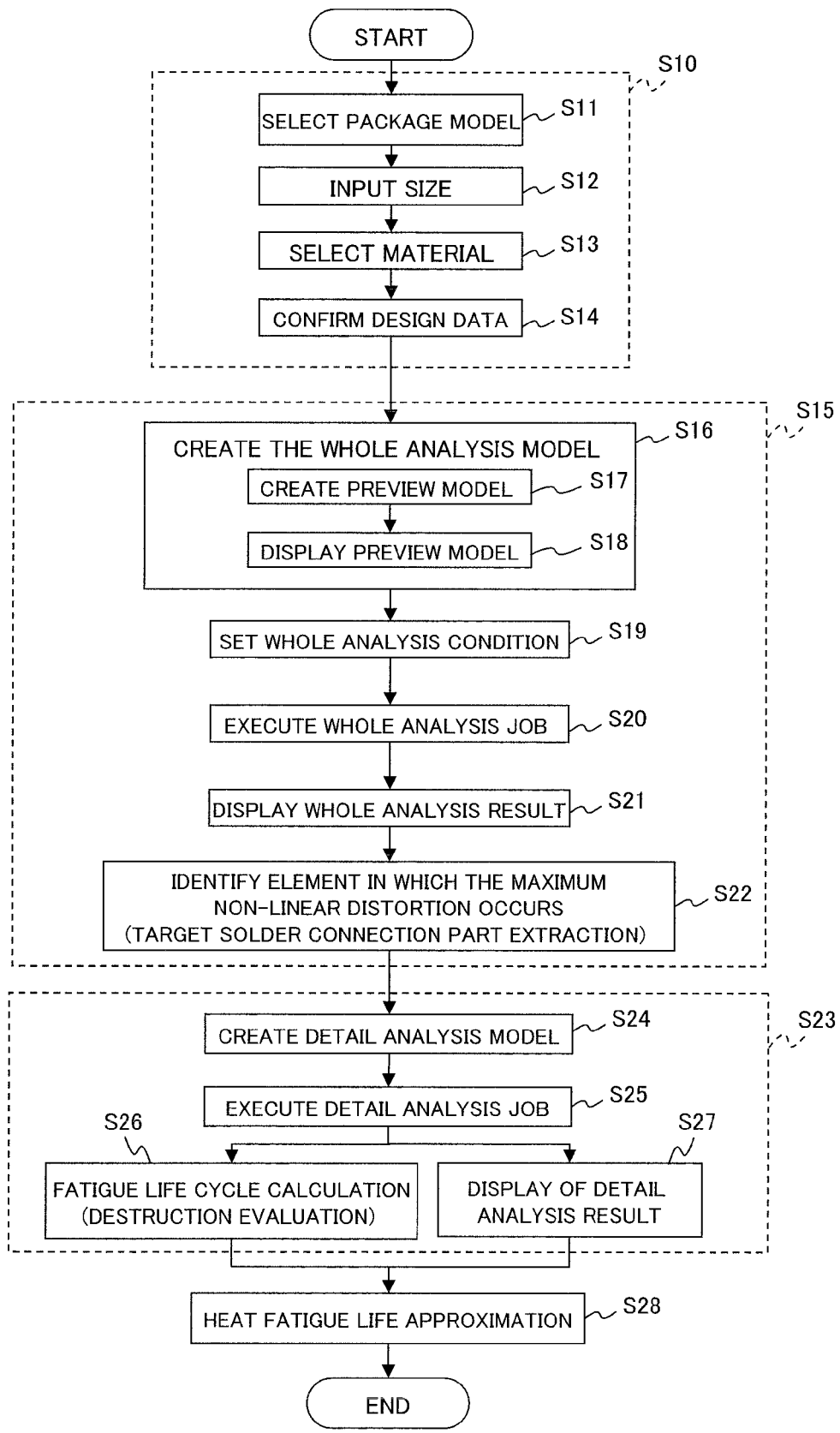
FIG. 13 is a flowchart for describing the procedure of electronic package optimizing method according to one preferred embodiment of the present invention.

Next, referring to the flowchart (step S10 through step S28) of FIG. 13, the electronic package optimizing method according to one preferred embodiment of the present invention. In this instance, the electronic package evaluation method according to one preferred embodiment of the present invention includes step S10 through step S27 shown in FIG. 13.

As shown in FIG. 13, in the electronic package optimizing unit 1, first, the design data creating unit 14 creates design data of an electronic package having a solder connection part using GUI (step S10; design data creating step).

More specifically, the design data creating unit 14 first selects a package model of an electronic package based on a package model held in the package model database 43 (step S11). The design data creating unit 14 determines each size of the package model (step S12) and determines the material of each part of the electronic package based on the physical property value information database 44 (step S13).

In this instance, at the above step S11, the design data creating unit 14 can set an analysis type and a model element type using GUI.

Further, at the above step S12, if the size is not set by a user, a default value is used, and if the size value of representative size parameters input by a user does not fall within an effective range, an alert is generated.

In this instance, at the above step S13, a user sets a material which is not held in the physical property value information database 44, the design data creating unit 14 sets such a material as design data.

Next, the design data creating unit 14, as shown in FIG. 14, makes the display unit 11 show thereon the parameter listing 11*d*, and encourages a user to confirm design data (step S14). In this instance, when the user changes the design data here, any one of the above step S11 through S13 is performed again as necessary. Further, the parameter listing 11*d* shown in FIG. 14 shows design data of the electronic package set and created by inputting by the user with the design data creating unit 14 using GUI. The parameter listing 11*d* contains the component size, the material name, and the material model for each component name of the construction component of the electronic package.

Then, when the design data creating unit 14 creates electronic package design data, the whole analysis unit 20 performs the whole analysis of the electronic package (step S15; whole analysis step).

Specifically, first, the whole analysis model creating unit 21 of the whole analysis unit 20 creates first mesh data (step S16; whole analysis model creating step). In this instance, at this step S16, as to the electronic package solder part, the whole analysis model creating unit 21 creates a solder connection part model having the same volume, height, and connection area as those of the solder connection part as described above. This solder connection part model is divided into multiple meshes, and thus the first mesh data is created.

Here, the whole analysis model creating unit 21 creates the electronic package preview model W (step S17), while creating the first mesh data after creating a ¼ model. The preview model W is, for example, as shown in FIG. 15, is shown on the monitor 11 (step S18). In this instance, it is preferable that the whole analysis model creating unit 21 makes the monitor show thereon the ¼ model as a preview model W.

Here, when the user visually checks the preview model W shown on the monitor 11, and decides that it is not a desired electronic package, the design data creating step S10 can be performed again, or the above step S17 and step S18 can be used for steps for confirming design data of the electronic package.

Next, the whole analysis executing unit 22 of the whole analysis unit 20 sets analysis condition (load, temperature change, etc.) necessary for analysis using GUI (step S19), and executes the whole analysis (step S20).

After that, the whole analysis evaluating unit 23 of the whole analysis unit 20 makes the monitor 11 show thereon a fringe diagram or the like of the displacement, force, distortion, and non-linear distortion (step S21). Further, the whole analysis evaluating unit 23 extracts a solder connection part in which the maximum non-linear distortion is generated, among positions at which non-linear distortion is generated in the electronic package, as a target solder connection part (step S22; a target solder part extracting step).

Then, when the whole analysis evaluating unit 23 extract a target solder connection part, the detail analysis unit 30 performs more accurate, detailed analysis than the whole analysis of the target solder connection part (step S23).

Specifically, the detail analysis model creating unit 31 of the detail analysis unit 30 creates the second mesh data as a detailed analysis model of such a target solder connection part (step S24), and the detail analysis executing unit 32 of the detail analysis unit 30 performs detailed analysis of the second mesh data (step S25).

Then, the detail analysis evaluating unit 33 of the detail analysis unit 30 calculates heat fatigue life (heat life cycle) from the result of the detailed analysis based on the above formula (1). If necessary, the detail analysis evaluating unit 33 performs destruction decision (step S26), and makes the monitor 11 thereon the detailed analysis result (step S27).

Next, the heat fatigue life optimizing unit 40 constructs an approximate polynomial as shown in the above formula (14) and changes parameters so that the fatigue life cycle of the electronic package calculated as a result of analysis by the detail analysis unit 30 falls within a predetermined range, thereby changing the design data of the electronic package (step S28; life cycle optimizing step), and the processing is ended.

In this manner, according to the electronic package optimizing unit 1 and the electronic package optimizing method, when the whole analysis model creating unit 21 creates the first mesh data for use in summary analysis of the whole electronic package (at the whole analysis model creating step), a solder connection part model which has the volume, height, and connection area the same as the volume, height, and connection area of the solder part is created for the electronic package solder part. Since this solder connection part model is divided into multiple meshes, it is possible to perform accurate analysis of, in particular, a solder connection part while reducing time required for the whole analysis by the whole analysis executing unit 22.

In addition, the whole analysis evaluating unit 23 extracts a solder connection part in which the maximum distortion is generated as a target solder connection unit, based on the analysis result obtained by the whole analysis executing unit 22. The detail analysis unit 30 performs more accurate analysis than the whole analysis unit 20 to such a target solder connection part to evaluate the reliability (fatigue life cycle), and thus significantly accurate analysis is performed on the electronic package, thereby an accurate evaluation being performed.

Accordingly, the heat fatigue life optimizing unit 40 changes parameters of design data of an electronic package, thereby improving (optimizing) the fatigue life cycle of the electronic package with reliability, so that it become possible to design an electronic package with a high reliability with a long fatigue life cycle.

In addition, the heat fatigue life optimizing unit 40 constructs an approximate polynomial indicating a relationship between the distortion of the electronic package and various design data parameters used design of experiments method by the heat fatigue life optimizing unit 40. Thus, as to the electronic package whose approximate polynomial is constructed, simulation is not performed, and significantly accurate evaluation can be performed in short time.

Further, since the design data creating unit 14 creates the design data of an electronic package using GUI, a user can easily create design data of an electronic package.

In addition, since the package model database 43 holds the representative size parameters for various types of electronic packages, it is possible for a user to easily create the electronic package design data. Further, the package model database 43 holds the effective range of the representative size parameters. If the value exceeding such a effective range is attempted to be set, the alert means 14a of the design data creating unit 14 generates an alert. Thus, it is surely possible to prevent to set the sizes which cannot be constructed.

Further, the package model database 43 holds a defined size value of each representative size parameter. Thus, even in the case where parts whose sizes are unknown, it is possible to create a design data of the electronic package.

Furthermore, the physical property value information database 44 holds the physical property value of materials. Thus, it is possible for a user to execute accurate analysis to the electronic package to perform accurate evaluation, without necessity for having particular knowledge about material property such as physical property or particular knowledge about simulation.

[2] Other Modifications

Further, the present invention should by no means be limited to the above-illustrated embodiment, but various changes or modifications may be suggested without departing from the gist of the invention.

The functions of the GUI control unit 10, the design data creating unit 14, the whole analysis model creating unit 21, the whole analysis executing unit 22, the whole analysis evaluating unit 23, the detail analysis model creating unit 31, the detail analysis executing unit 32, the detail analysis evaluating unit 33, and the heat fatigue life optimizing unit 40, can be realized by executing predetermined application program (an electronic package optimizing program or an electronic package evaluation program) by a computer (including a CPU, an information processing unit, and various terminals).

The programs are recorded in computer-readable recording media such as flexible discs, CDs (CD-ROMs, CD-Rs, and CD-RWs), and DVDs (DVD-ROMs, DVD-RAMs, DVD-Rs, DVD-RWs, DVD+Rs, and DVD+RWs). The computer reads the programs from such recording media to transfer the programs to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a micro processor such as a CPU and a means for reading computer programs from recording media.

The aforementioned predetermined application programs contain program codes that instruct the computer to function as the GUI control unit 10, the design data creating unit 14, the whole analysis model creating unit 21, the whole analysis executing unit 22, the whole analysis evaluating unit 23, the detail analysis model creating unit 31, the detail analysis executing unit 32, the detail analysis evaluating unit 33, and the heat fatigue life optimizing unit 40. Further, a part of those functions can be realized by the OS, not by such application programs.

Further, the application program as the above electronic package evaluation program contains program codes which instructs the above computer to realize the functions as the GUI control unit 10, the design data creating unit 14, the whole analysis model creating unit 21, the whole analysis executing unit 22, the whole analysis evaluating unit 23, the detail analysis model creating unit 31, the detail analysis executing unit 32, and the detail analysis evaluating unit 33. In addition, a part of such functions can be realized by an OS, not by application programs.

Moreover, as recording media used in the embodiments of the present invention, not only the above-mentioned flexible discs, CDs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs) of computers, external storage devices, and printed matter with any codes such as barcodes printed thereon, are also applicable.

What is claimed is:

1. An electronic package evaluation apparatus, comprising:
    a design data creating unit which creates design data of the electronic package using a GUI (Graphical User Interface);
    a whole analysis model creating unit which creates first mesh data, for executing analysis of an electronic package, by dividing each component composing the electronic package into a plurality of meshes based on the design data of the electronic package having a solder connection part;

a whole analysis executing unit which executes an analysis of the electronic package using the first mesh data created by said whole analysis model creating unit;

a target solder connection part extracting unit which extracts a target solder connection part based on an analysis result obtained by said whole analysis executing unit; and a detail analysis unit which evaluates a reliability of the electronic package by executing a more accurate analysis than the analysis performed by the whole analysis executing unit for the target solder connection part extracted by said target solder connection part extracting unit, said whole analysis model creating unit creating a solder connection part model having the same volume, height, and connection area as the volume, height, and connection area of the solder connection part and is composed of a polyhedron, and dividing the solder connection part model into a plurality of meshes, to create the first mesh data, said whole analysis executing unit calculating a distortion generated in the electronic package as a result of the analysis, and said target solder connection part extracting unit extracting a solder connection part in which the largest distortion is generated as the target solder connection part, based on the distortion as analysis results obtained by said whole analysis executing unit.

2. An electronic package evaluation apparatus as set forth in claim 1, further comprising:

a package model holding unit which holds an electronic package model of a plurality of types, wherein said design data creating unit creates the design data of the electronic package based on the electronic package model corresponding to a type of the electronic package selected from the plurality of types of electronic package models in said package model holding unit.

3. An electronic package evaluation apparatus as set forth in claim 2, wherein each of the plurality of types of electronic package models includes a representative size parameter, and wherein said design data creating unit creates the design data of the electronic package based on the representative parameter size value input by the GUI.

4. An electronic package evaluation apparatus as set forth in claim 3, wherein the plurality of types of electronic package models contain an effective range of the representative size parameter, and wherein said design data creating unit includes an alert unit which generates an alert when a value of the representative size parameter input by the GUI is not within the effective range.

5. An electronic package evaluation apparatus as set forth in claim 2, wherein each of the plurality of types of electronic package model holds a specified size value of the representative size parameter, and wherein said design creating unit creates the design data of the electronic package based on the specified size value of the representative parameter.

6. An electronic package evaluation apparatus as set forth in claim 1, further comprising:

a material information holding unit which holds material information including a plurality of types of materials to be used for the electronic package, wherein the whole analysis executing unit executes the analysis based on a type of material selected based on the material information by the GUI.

7. An electronic package evaluation apparatus as set forth in claim 1, said detail analysis unit including:

a detail analysis model creating unit which creates second mesh data more accurate than the first mesh data, which is created by said whole analysis model creating unit, for the target solder connection part extracted by said target solder connection part extracting unit;

a detail analysis executing unit which analyzes the target solder connection part based on the second mesh data created by the detail analysis model creating unit; and a detail analysis evaluating unit which evaluates the reliability of the electronic package based on an analysis result obtained by the detail analysis executing unit.

8. An electronic package evaluation apparatus as set forth in claim 7, wherein said detail analysis evaluating unit calculates a non-linear distortion from a creep distortion and a plastic distortion, which are analysis results obtained by the detail analysis executing unit, and performs calculation of a life cycle using a maximum value of the calculated non-linear distortion, thereby calculating life cycle as the reliability of the electronic package:

$$N_f = \frac{1}{2}\left(\frac{\Delta\varepsilon_{in}}{\varepsilon_0}\right)^{-n} \quad (1)$$

where Nf is life cycle; $\Delta\varepsilon_{in}$ is the maximum value of non-linear distortion; $\varepsilon_0$,n are constants.

9. An electronic package evaluation apparatus as set forth in claim 8, wherein said detail analysis evaluating unit evaluates whether a destruction of the electronic package occurs as the reliability of the electronic package based on the life cycle calculated using the analysis result obtained by said detail analysis executing unit.

10. An electronic package optimizing apparatus, comprising:

a design data creating unit which creates design data of the electronic package using a GUI (Graphical User Interface);

a whole analysis model creating unit which creates first mesh data, for executing analysis of an electronic package, by dividing each component composing the electronic package into a plurality of meshes based on the design data of the electronic package having a solder connection part;

a whole analysis executing unit which executes an analysis of the electronic package using the first mesh data created by said whole analysis model creating unit;

a target solder connection part extracting unit which extracts a target solder connection part based on an analysis result obtained by said whole analysis executing unit;

a detail analysis unit which executes a more accurate analysis than the analysis performed by the whole analysis executing unit for the target solder connection part extracted by said target solder connection part extracting unit; and a life cycle optimizing unit which changes the design data of the electronic package so that life cycle, calculated as analysis result obtained by said detail analysis unit, of the electronic package falls within a predetermined range, said whole analysis model creating unit creating a solder connection part model having the same volume, height, and connection area as the volume, height, and connection area of the solder connection part and is composed of a polyhedron, and dividing the solder connection part model into a plurality of meshes, thereby creating the first mesh data, said whole analysis executing unit calculating a distortion generated in the electronic package as a result of the analysis, and said target solder connection part extracting unit extracting a solder connection part in which the largest distortion is generated as the target solder connection part, based on the distortion as analysis results obtained by said whole analysis executing unit.

11. An electronic package optimizing apparatus as set forth in claim 10, wherein said life cycle optimizing unit constructs, by design of experiment, approximate polynomial with items contained in the design data of the electronic package as parameters based on the analysis result obtained by said detail analysis unit, changes the parameters of the design data based on the approximate pronominal.

12. A computer readable recording medium which records an electronic package evaluation program that instructs a computer to execute a function of evaluating an electronic package having a solder connection part, said electronic package evaluation program instructing the computer to function as:

a design data creating unit which creates design data of the electronic package using a GUI (Graphical User Interface);

a whole analysis model creating unit which creates first mesh data, for executing analysis of an electronic package, by dividing each component composing the electronic package into a plurality of meshes based on the design data of the electronic package having a solder connection part;

a whole analysis executing unit which executes an analysis of the electronic package using the first mesh data created by said whole analysis model creating unit;

a target solder connection part extracting unit which extracts a target solder connection part based on a result of analysis by said whole analysis executing unit;

a detail analysis unit which executes a more accurate analysis than the analysis performed by the whole analysis executing unit for the target solder connection part extracted by said target solder connection part extracting unit, said whole analysis model creating unit creating a solder connection part model having the same volume, height, and connection area as the volume, height, and connection area of the solder connection part and is composed of a polyhedron, and dividing the solder connection part model into a plurality of meshes, thereby creating the first mesh data, said whole analysis executing unit calculating a distortion generated in the electronic package as a result of the analysis, and said target solder connection part extracting unit extracting a solder connection part in which the largest distortion is generated as the target solder connection part, based on the distortion as analysis results obtained by said whole analysis executing unit.

13. A computer readable recording medium which records an electronic package evaluation program as set forth in claim 12, that instructs the computer to function as a design data creating unit which creates the design data of the electronic package using GUI (Graphical User Interface).

14. A computer medium recording an electronic package evaluation program as set forth in claim 12, wherein when the electronic package evaluating program instructs the computer to function as the detail analysis unit, the electronic package evaluating program instructs the computer to function as:

a detail analysis model creating unit which creates second mesh data more accurate than the first mesh data, which is created by said whole analysis model creating unit, for the target solder connection part extracted by said target solder connection part extracting unit;

a detail analysis executing unit which analyzes the target solder connection part based on the second mesh data created by the detail analysis model creating unit; and a detail analysis evaluating unit which evaluates a reliability of the electronic package based on an analysis result obtained by the detail analysis executing unit.

15. A computer readable recording medium recording an electronic package evaluating program as set forth in claim 14, which instructs the computer to function as said detail analysis evaluating unit that calculates a non-linear distortion from a creep distortion and a plastic distortion, which are analysis results obtained by said detail analysis executing unit, and performs a calculation of a life cycle using a maximum value of calculated non-linear distortion, thereby calculating life cycle as the reliability of the electronic package:

$$N_f = \frac{1}{2}\left(\frac{\Delta\varepsilon_{in}}{\varepsilon_0}\right)^{-n} \quad (1)$$

where $N_f$ is life cycle; $\Delta\epsilon_{in}$ is the maximum value of non-linear distortion; $\epsilon_0$, n are constants.

16. A computer readable recording medium recording an electronic package evaluating program as set forth in claim 15, which makes the computer function as said detail analysis evaluating unit which evaluates whether a destruction of the electronic package occurs as the reliability of the electronic package based on the life cycle calculated using the analysis result obtained by said detail analysis executing unit.

17. A method of evaluating an electronic package including a solder connection part by a computer, comprising:

creating design data of the electronic package using a GUI (Graphical User Interface);

creating first mesh data usable to analyze the electronic package including the solder connection part, by dividing each component composing the electronic package into a plurality of meshes based on design data of the electronic package, and by creating a solder connection part model having the same volume, height, and connection area as the volume, height, and connection area of the solder connection part and composed of a polyhedron;

analyzing by the computer the electronic package using the first mesh data;

extracting the target solder connection part based on a result of the analyzing;

performing a more accurate analysis for the extracted target solder connection part; and modifying the design data of the electronic package to achieve a life cycle value within a predetermined range, the life cycle value being calculated as a result of the more accurate analysis, calculating a distortion generated in the electronic package as a result of the analysis, and extracting a solder connection part in which the largest distortion is generated as the target solder connection part, based on the calculated distortion as analysis results.

* * * * *

UNITED STATES PATENT AND TRADEMARK OFFICE
CERTIFICATE OF CORRECTION

| | |
|---|---|
| PATENT NO. | : 7,725,866 B2 |
| APPLICATION NO. | : 11/855681 |
| DATED | : May 25, 2010 |
| INVENTOR(S) | : Yoko Kobayashi et al. |

Page 1 of 1

It is certified that error appears in the above-identified patent and that said Letters Patent is hereby corrected as shown below:

Column 22, Line 67 delete "and" after "part;".

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,725,866 B2                    Page 1 of 1
APPLICATION NO.  : 11/855681
DATED            : May 25, 2010
INVENTOR(S)      : Yoko Kobayashi et al.

It is certified that error appears in the above-identified patent and that said Letters Patent is hereby corrected as shown below:

Cover page, insert item
--(63) Related U.S. Application Data:
Continuation of Application No. PCT/JP2005/005025, filed on March 18, 2005.--

Signed and Sealed this
Seventeenth Day of May, 2011

David J. Kappos
*Director of the United States Patent and Trademark Office*